No. 873,621. PATENTED DEC. 10, 1907.
W. C. SCHWARZ.
CONTROLLING VALVE FOR HYDRAULIC TRANSMISSION DEVICES.
APPLICATION FILED DEC. 15, 1906.

2 SHEETS—SHEET 1.

ATTEST.
H. J. Fletcher.
M. W. Smith

INVENTOR.
WM. C. SCHWARZ.
BY Higdon & Longan
ATT'Y'S.

No. 873,621. PATENTED DEC. 10, 1907.
W. C. SCHWARZ.
CONTROLLING VALVE FOR HYDRAULIC TRANSMISSION DEVICES.
APPLICATION FILED DEC. 15, 1906.

2 SHEETS—SHEET 2.

ATTEST.
H. J. Fletcher.
M. P. Smith.

INVENTOR.
WM. C. SCHWARZ.
BY Higdon & Longan
ATTY'S

UNITED STATES PATENT OFFICE.

WILLIAM C. SCHWARZ, OF EDWARDSVILLE, ILLINOIS.

CONTROLLING-VALVE FOR HYDRAULIC TRANSMISSION DEVICES.

No. 873,621.  Specification of Letters Patent.  Patented Dec. 10, 1907.

Application filed December 15, 1906. Serial No. 347,976.

*To all whom it may concern:*

Be it known that I, WILLIAM C. SCHWARZ, a citizen of the United States, and resident of Edwardsville, Madison county, Illinois, have invented certain new and useful Improvements in Controlling-Valves for Hydraulic Transmission Devices, of which the following is a specification containing a full, clear, and exact description, reference being had to the accompanying drawings, forming a part hereof.

My invention relates to an automatic controlling valve for hydraulic transmission devices, and the object of my invention is to provide a hydraulic transmission device with a controlling valve which may be mechanically opened and closed as desired, and which, when the transmission device is in operation, will be automatically opened and closed to correspond with the speed of the transmission device.

A further object of my invention is to provide an automatic valve for the form of hydraulic transmission device on which I have filed an application for patent May 29, 1906, Serial No. 319,357.

My improved valve consists in a pair of cylindrical members, one arranged on the interior of the other, which cylindrical members are provided with oppositely arranged openings, through which fluid passes, and which cylindrical members are mechanically and automatically actuated to open or close the passageway through said members.

My invention further consists in certain novel features of construction and arrangement of parts, which will be hereinafter more fully set forth, pointed out in the claims, and illustrated in the accompanying drawings, in which:—

Figure 1:
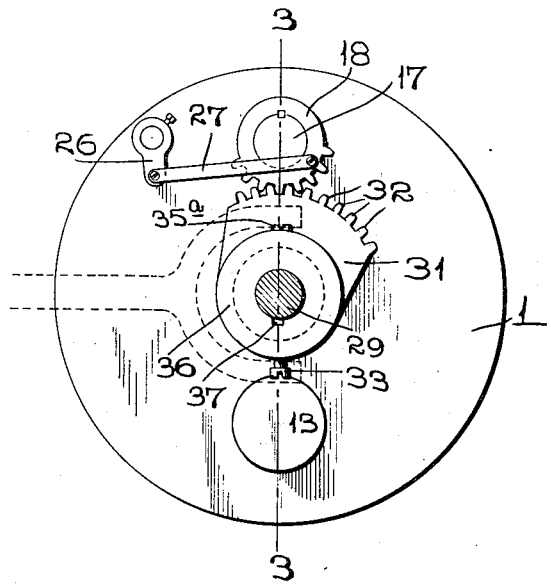
Figure 2:
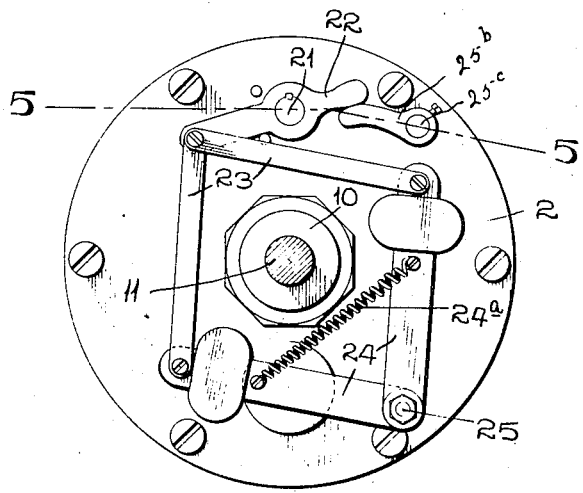
Figure 3:
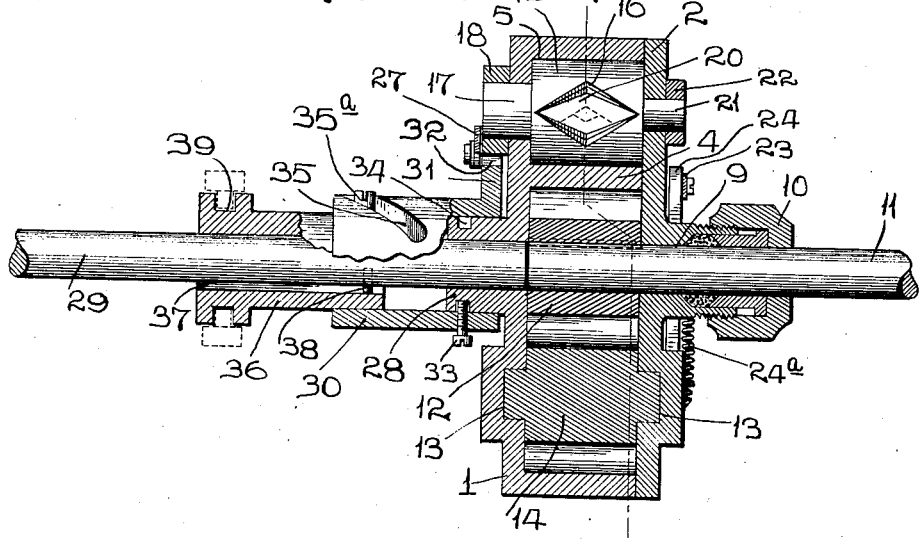
Figure 4:
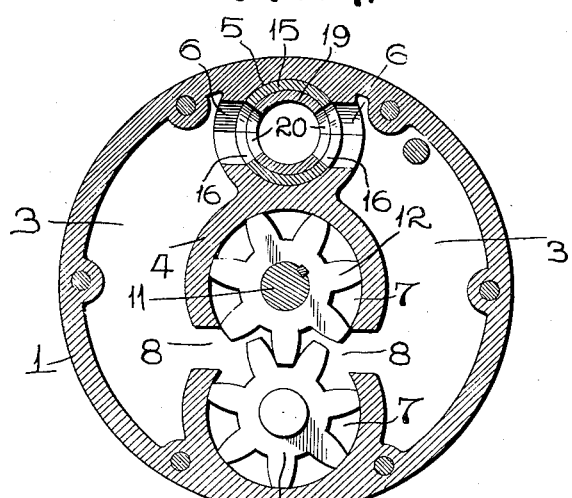
Figure 5:
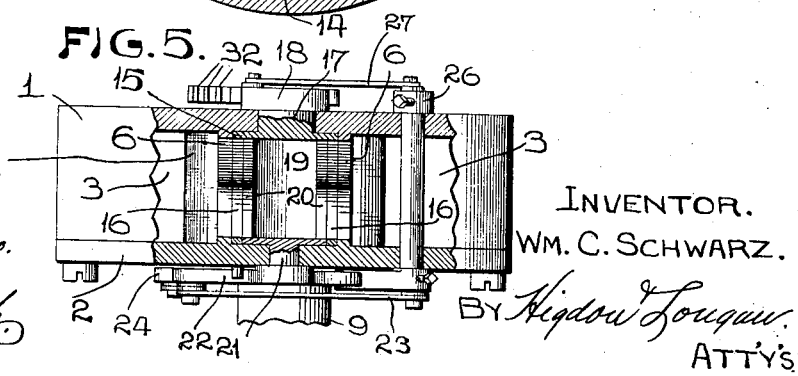

Figure 1 is a side elevation of a hydraulic transmission device equipped with my improved valve; Fig. 2 is an elevation of the rear side of the transmission device; Fig. 3 is a vertical section taken on the line 3—3 of Fig. 1; Fig. 4 is a vertical section taken on the line 4—4 of Fig. 3; Fig. 5 is a horizontal section taken on the line 5—5 of Fig. 2.

Referring by numerals to the accompanying drawings:—1 designates a drum, or hollow cylinder, having a removable side 2, and the interior of said cylinder being divided into two compartments 3 by the web 4. Formed in the upper end of this web 4 is a cylindrical valve chamber 5, and oppositely arranged diamond shaped ports 6 are formed through the web to establish communication between the chambers 3 and 5. Formed in the web 4 below the chamber 5 is a pair of circular chambers 7, and formed through the walls surrounding these chambers are the oppositely arranged ports 8, which establish communication between the chambers 3 and 7. One of the chambers 7 is arranged in the center of the drum, and the opposite chamber being located on the opposite side of the central chamber from the valve chamber 5.

Formed in the center of the removable plate 2 is a bearing 9, provided with a suitable gland or stuffing box 10, and arranged for rotation in said bearing is the engine or motor shaft 11, the inner end of which extends through the center chamber 7, and fixed thereon and occupying said chamber is a pinion 12.

Formed in the plate 2 and in the side face of the cylinder 1 are bearings 13, which are in alinement with the center of the lower one of the chambers 7, and journaled for rotation in said bearing are the trunnions of a pinion 14, which is of the same size as and meshes with the pinion 12.

Mounted for rotation in the valve chamber 5 is a tubular valve 15, through opposite sides of which are formed diamond shaped openings 16, which are adapted to coincide with the diamond shaped ports 6, and formed integral with one end of this tubular valve 15 is a journal 17, which extends through a suitable bearing formed in the side wall of the cylinder 1, and fixed on the extended end of said journal is a segmental pinion 18.

Arranged for rotation within the tubular valve 15 is a tubular valve 19, through the sides of which are formed the oppositely arranged diamond shaped ports 20, which are adapted to coincide with the ports 16 and 6 previously described, and formed integral with one end of this tubular valve 19 is a journal 21, which operates through a suitable bearing formed in the plate 2, and fixed on the extended end of said journal is a lever 22. Pivotally connected to the lower end of this lever 22 is a pair of links 23, the lower ends of which are pivotally connected to the upper ends of a pair of weighted levers 24, the lower ends of which are journaled upon a pin 25 fixed to the plate 2 at a point approximately opposite the point where the links 23 are connected to the lever 22. The ends of a retractile coil spring 24ª are connected to the weighted levers 24 for the purpose of normally drawing said levers toward one another.

The under side of the end of the lever 22, opposite the end to which the links 23 are connected, is engaged by a finger 25^b which is fixed upon a shaft 25^c, the latter passing transversely through the cylinder 1 and plate 2, and its opposite end being provided with a short arm 26. Pivotally connected to the lower end of this last mentioned arm is a link 27, the opposite end of which is pivotally connected to the face of the pinion 18.

A hub 28 is formed integral with the outer face of the side wall of the cylinder 1, and rigidly seated in said hub, and in alinement with the shaft 11, is a shaft 29. Arranged for rotation on the outer end of the hub 28 is a sleeve 30, on the inner end of which is formed a segmental flange 31, provided with teeth 32, which mesh with the teeth of the segmental pinion 18. A retaining screw 33 passes through the sleeve 30 and enters a corresponding groove 34 formed in the periphery of the hub 28. Formed in the sleeve 30 is a spirally disposed slot 35, which extends approximately one-quarter around said sleeve, and arranged to slide on the shaft 29, within the sleeve, is a collar 36, which is provided with a slot 37 which receives a pin 38 fixed in said shaft 29. The outer end of the sleeve 36 is provided with a groove 39 which receives the end of a suitable lever or device for shifting said sleeve 36 longitudinally upon the shaft 29. Seated in the sleeve 36 and extending through the spiral slot 35 is a pin 35^a. The entire space within the cylinder 1 and the compartment 7 is filled with a suitable heavy liquid, such as lubricating oil or glycerin.

The operation of the device is as follows: The engine or motor shaft 11 being rotated necessarily drives the pinion 12 in the center of the cylinder 1, and said pinion will impart a corresponding rotary motion to the pinion 14. As these pinions rotate, the liquid in one of the compartments 3 will be drawn into the compartments 7 through one of the ports 8, and discharged through the opposite port 2, and from thence said liquid will pass through the open ports 6, 16, and 20, back to the first compartment 2, and thus a continuous circulation of the liquid is maintained as long as the ports 16 and 20 in the cylindrical valves are in alinement with one another, or open. To lock the various parts together for imparting rotary motion to the cylinder 1 and shaft 29, the sleeve 36 is shifted longitudinally on the shaft 29, and the pin 35^a engaging in the spiral slot 35 partially rotates the sleeve 30, and the segment 31 meshing with the segmental pinion 18 correspondingly moves said pinion, and correspondingly rotates the tubular valve 15. The movement of the pinion 18 is transferred by means of the link 27 and arm 26 to the shaft 25^a, and the finger 25 carried by said shaft bears against the under side of the forward end of the lever 22, which movement causes a partial rotation of the tubular valve 19 to take place, the movement of which is directly opposite the rotary motion of the tubular valve 15; and, as a result, the diamond shaped ports 16 and 20 are moved out of alinement with one another, thus cutting off the passage of liquid through the ports 6, and this action shuts off the circulation of liquid from one compartment 3 to the other, and, as a result, the pinion 12 can no longer drive the pinion 14, and the parts will therefore be locked to one another, and the cylinder 1 and shaft 29 will be driven at the same rate of speed as is the engine or motor shaft 11. When the cylinder 1 and shaft 29 are thus driven, they will be operating at the maximum speed, and should it be desirable that the shaft 29 be driven at a medium speed, the sleeve 26 is shifted so as to rotate the sleeve 30, and through the medium of the various parts the tubular valves 15 and 19 are partially rotated in such a manner as to partially open the diamond shaped ports 16 and 20, and this results in a slight circulation of the liquid through said ports, and consequently the pinions 12 and 14 will correspondingly operate, and the rotary motion imparted to the shaft 29 will consequently be reduced. When the proper speed of the shaft 29 is obtained by proper adjustment of the valves 15 and 19, said speed is maintained by the automatic action of the valve 19, for in case the load on the shaft 29 is increased for any reason, the speed of the cylinder is consequently retarded, and as a result, the weighted levers 24 will swing inwardly by centrifugal action, the links 23 will actuate the finger 22, and, as a result, the cylindrical valve 19 is rocked so as to relatively decrease the openings between the ports 16 and 20, and thus a less amount of liquid is allowed to pass through the ports in the valves, and the speed of the shaft 29 is correspondingly increased. This regulation of the passage of the liquid through the valves is automatically maintained by the centrifugal action of the weighted levers 24, and thus the speed at which the shaft 29 is driven can be very accurately regulated. The diamond shaped ports in the valves provide for a gradual increasing or diminishing area of opening through which the liquid passes while said valves are in operation, and this arrangement dispenses with any sudden movement or jar resulting from a quick transferring of the rotary motion of the engine shaft to the shaft 29.

I claim:—

1. The combination with a cylindrical casing divided into two compartments by a bifurcated partition, of a pair of meshing pinions arranged for rotation in the chambers within the bifurcated partition, a pair of perforated cylinders, one upon the other, to form an adjustable valve for controlling the flow of liquid from one compartment to the other, and a governor mechanism for automatically regulating the area of the opening through said valve.

2. The combination with a cylindrical casing, divided into two compartments by a bifurcated partition, of a pair of pinions arranged for rotation in the chambers within the bifurcated partitions, a pair of perforated cylinders, one upon the other, to form a valve for controlling the flow of liquid from one compartment to the other, means whereby said valve is opened or closed, and a governor mechanism actuated by the rotation of the casing for automatically opening or closing the valve.

3. The combination with a pair of alined shafts, of a hollow cylinder rigidly fixed on one of the shafts, which cylinder is formed into two compartments, a pair of meshing pinions arranged for operation within the cylinder between the compartments, one of which pinions is fixed on the shaft opposite the shaft to which the cylinder is fixed, a pair of perforated cylinders, one upon the other, to form a valve which is arranged between the two compartments in the cylinder, and an automatic governor mechanism for shifting the relative positions of the cylinders forming the valve to vary the area of the opening therethrough.

4. The combination with a pair of alined shafts, of a hollow cylinder rigidly fixed on one of the shafts, which cylinder is formed into two compartments, a pair of meshing pinions arranged for operation within the cylinder between the compartments, one of which pinions is fixed on the shaft opposite the shaft to which the cylinder is fixed, a pair of perforated cylinders, one upon the other, to form a valve arranged between the two compartments in the cylinder, an automatic governor mechanism for shifting the relative positions of the cylinders forming the valve to vary the area of the opening therethrough, and a separate means connected to the cylinders forming the valve for opening and closing the same.

5. The combination with a cylindrical casing, divided into two compartments, which compartments are filled with fluid, means arranged between the compartments for delivering the fluid from one compartment to another, a pair of perforated cylinders, one upon the other, to form a valve arranged between the compartments for controlling the flow of liquid from one compartment to the other, and a governor mechanism actuated by the rotation of the casing for automatically regulating the area of opening through the cylinders forming the valve.

In testimony whereof, I have signed my name to this specification, in presence of two subscribing witnesses.

WILLIAM C. SCHWARZ.

Witnesses:
M. P. SMITH,
E. L. WALLACE.